United States Patent [19]

Martin

[11] Patent Number: 4,749,215
[45] Date of Patent: Jun. 7, 1988

[54] CONDUIT SPLIT CASE EXPANSION COUPLING

[76] Inventor: Grady L. Martin, P.O. Box 1588, Conway, Ark. 72032

[21] Appl. No.: 86,166

[22] Filed: Aug. 17, 1987

[51] Int. Cl.⁴ ............................................. F16L 55/00
[52] U.S. Cl. .................... 285/187; 285/298; 285/337; 285/346; 285/373
[58] Field of Search ............... 285/373, 302, 177, 337, 285/413, 419, 298, 368, 165, 348, 346, 187; 403/301, 312, 104

[56] References Cited

U.S. PATENT DOCUMENTS

| | | | |
|---|---|---|---|
| 603,720 | 5/1898 | Avery | 285/302 X |
| 1,334,778 | 3/1920 | Mohan | 285/413 X |
| 1,733,072 | 10/1929 | Pierce | 285/298 |
| 2,450,458 | 10/1948 | Thompson et al. | 285/414 X |
| 4,648,631 | 3/1987 | Bryant | 285/368 X |
| 4,662,658 | 5/1987 | Holowach et al. | 285/419 X |

FOREIGN PATENT DOCUMENTS

| | | | |
|---|---|---|---|
| 216847 | 8/1961 | Austria | 285/373 |
| 2043812 | 10/1980 | United Kingdom | 285/373 |

Primary Examiner—Dave W. Arola

[57] ABSTRACT

A split case expansion coupling for steel pipe conduit that is made in two identical half sections that fit over any given commercial steel pipe size with one pipe end fixed and with the other pipe end being free to expand or contract. The free end has a bolted split cup containing a packing seal. The casing body at the fixed end fits the outside diameter of the connecting pipe and is clamped tightly in place by means of bolted mating flanges containing a compressible gasket. The expansion coupling can be installed or removed without disturbing the contents of a pipe conduit and without any torch-cutting or welding being required on the pipe conduit.

1 Claim, 3 Drawing Sheets

CONDUIT SPLIT CASE EXPANSION COUPLING

SUMMARY OF THE INVENTION

The split case expansion coupling is intended for use in cross-country fibre optic cable conduit runs made of steel pipe that are installed by telephone companies or other similiar applications. The expansion coupling is made in bolted half sections so that it can be installed or removed from pipe or conduit runs without cutting or removing the cable located inside the steel pipe conduit. Expansion couplings are installed in conduit located above-ground to compensate for thermal expansion with changes in ambient temperature.

The split case expansion coupling is made in two identical half sections which are bolted together with flat mating flanges. The coupling is designed to fit over standard pipe size conduit. One end of the casing has an inside diameter equal to the outside diameter of the connecting line pipe and becomes fixed when bolted tightly in place. The other end of the casing has an inside diameter greater than the outside diameter of the connecting line pipe and becomes the free end allowing the line pipe to expand inside the casing. The free end is sealed with a packing ring inside a split cup which is bolted in place. All coupling casing and end cup mating flanges are sealed with gaskets which completes the sealing-out of dust and moisture.

The expansion coupling assembly is made of carbon steel or other suitable material and is coated with hot-dipped zinc galvanizing or other suitable weather resistant material. The expansion coupling can be made for any size steel pipe conduit and can be made for any reasonable expansion length. Installation of the expansion coupling does not require any torchcutting or welding on the connecting line pipe which would not be permitted with a telephone cable in place inside the pipe conduit.

DESCRIPTION OF VIEWS OF DRAWINGS

DETAILED DESCRIPTION

Figure 1:
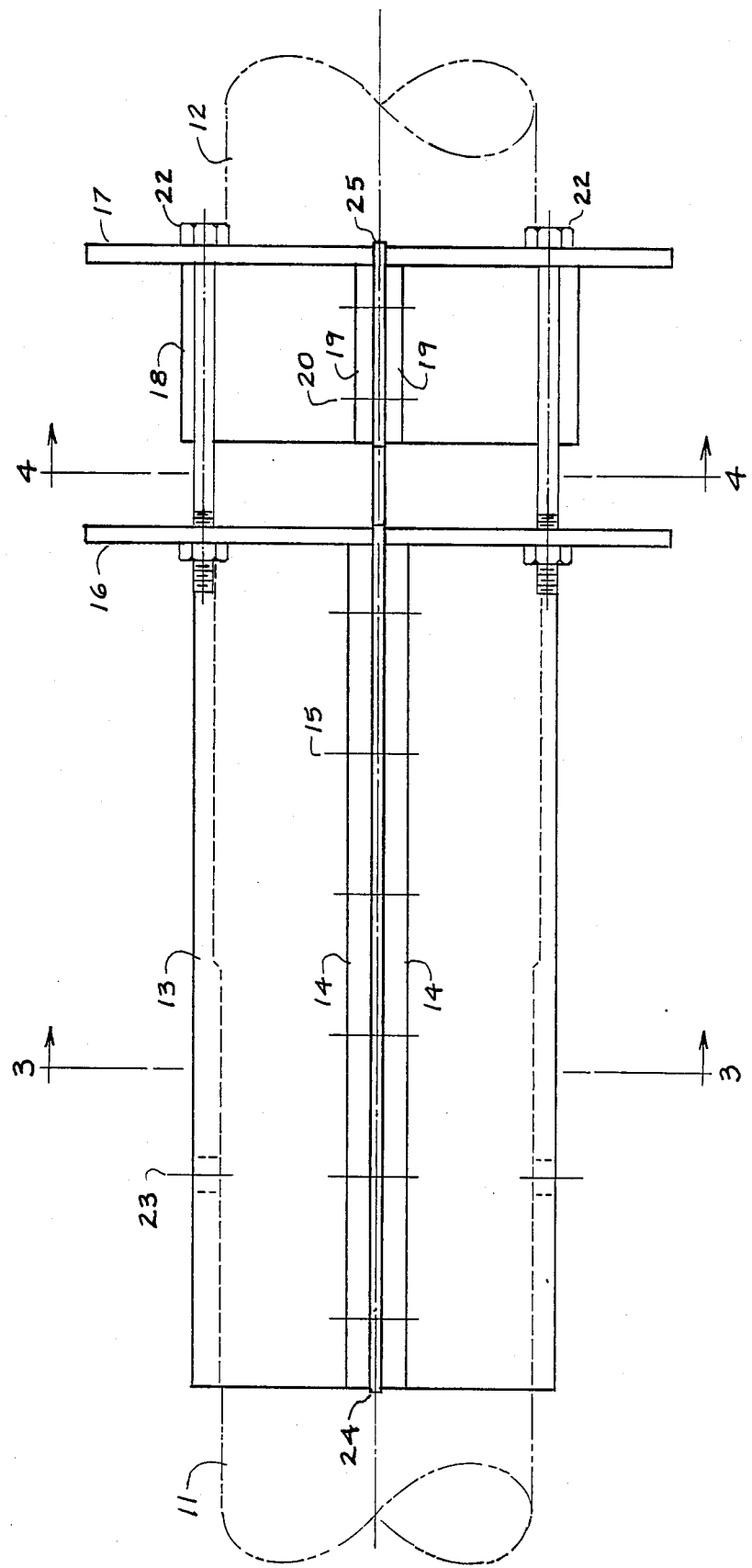
FIG. 1 is a side view of the expansion coupling assembly bolted in place on a steel pipe conduit.

FIG. 1 shows the expansion coupling assembly as it would be bolted together in place over steel pipe conduit connecting ends. The casing is made in two identical half sections consisting of casing body 13, which is bolted together along mating flanges 14 with bolts 15. The inside diameter of the fixed end part of casing 13 is the same as the outside diameter of the connecting line pipe end 11 and casing 13 is cut with a clearance between flanges 14 and fitted with compressible gasket 24 so that casing 13 pulls down tightly on the line pipe fixed end 11 when bolted in place. Compressible gasket 24 is made of cork or other suitable material. For additional locking of casing 13 to pipe end 11, casing 13 is fitted with threaded hole 23 for installation of a set screw in each half section. The compressible gasket 24 seals the inside of casing 13 from any dust or moisture from the outside.

Figure 2:
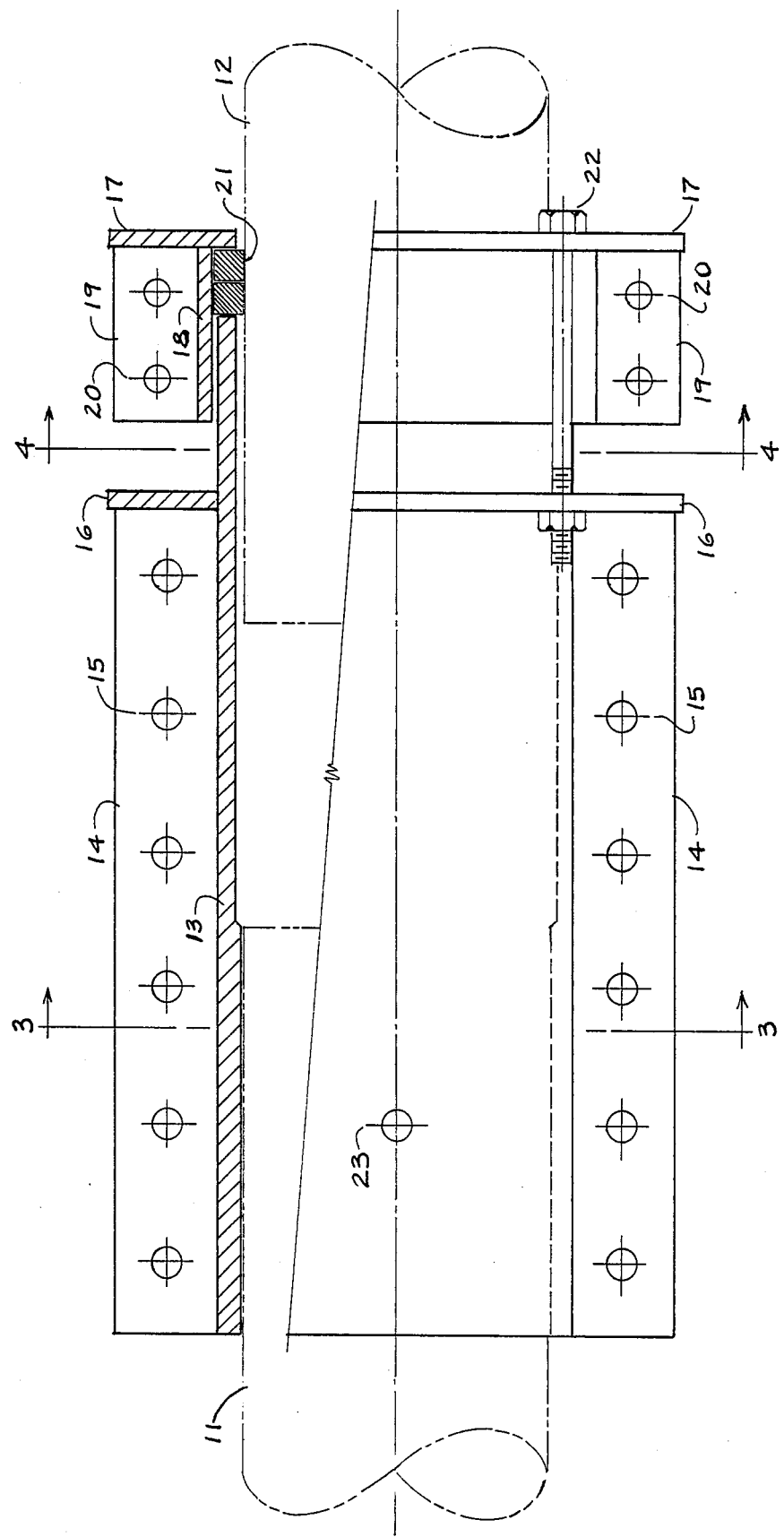
FIG. 2 is a top view of the expansion coupling assembly with a part section showing the internal details.

FIG. 2 shows the inside diameter of the free end part of casing 13 to be greater than the outside diameter of connecting line pipe 12 which allows free expansion of pipe 12 inside casing 13. Pipe 12 would be externally guided and arranged by others so that thermal expansion is driven into the expansion coupling. The end seal cup 18 is made in two identical half sections consisting of mating flanges 19 with bolts 20 and fitted with gasket 25 (shown FIG. 1) which is not compressible. End seal cup 18 contains square braided packing rings 21 which seal out dust and moisture when held tightly by bolts 22 fixed to bolting flanges 16 and 17. Bolting flange 17 has an inside diameter equal to the inside diameter of the free end part of casing 13 for pipe 12 clearance. Braided packing 21 would be commercially available material consisting of fiberglass or aramid fibers for strength and containing TFE resin for ease of sliding of pipe 12 surface. Other suitable packing materials can be used.

Figure 3:
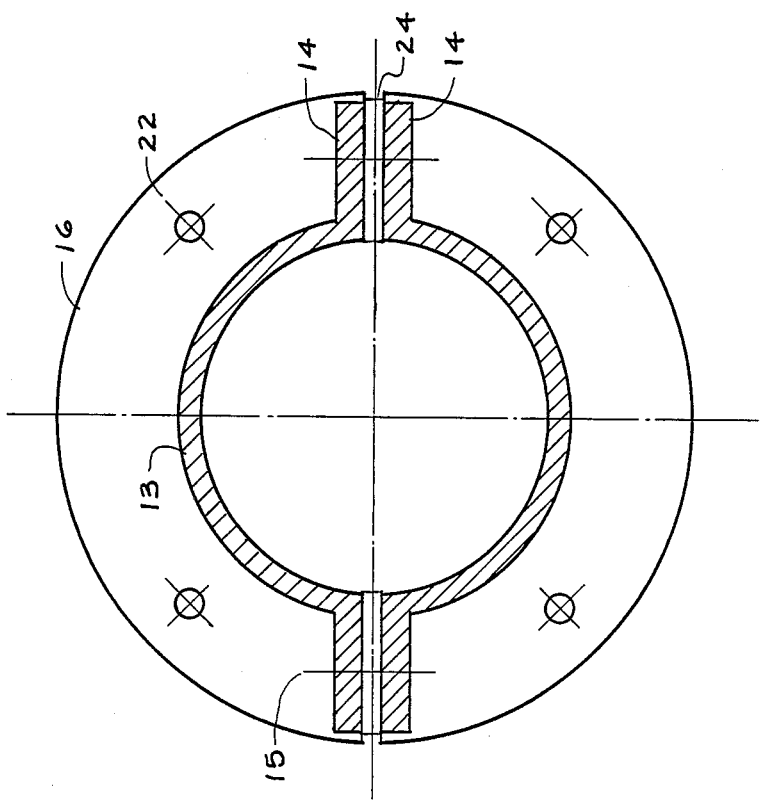
FIG. 3 is a sectional view thru the expansion coupling casing body.

FIG. 3 shows a sectional view thru the casing body 13 with mating flanges 14 containing compressible gasket 24 which allows casing body 13 to be pulled tightly in place over connecting pipe end 11 (shown FIG. 1). Flange 16 contains bolts 22 to match end seal cup flange 17 (shown FIG. 4).

Figure 4:
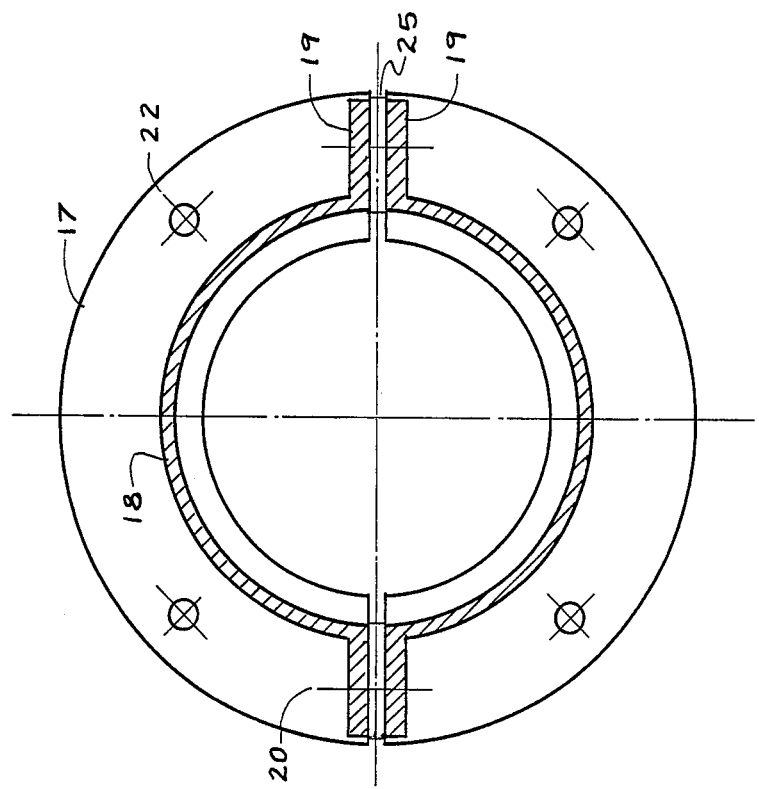
FIG. 4 is a sectional view showing the end seal cup.

FIG. 4 shows an end view of end seal cup 18 with mating flanges 19 containing non-compressible gasket 25. Flange 17 contains bolts 22 to match casing flange 16 (shown FIG. 3).

While the foregoing has described certain specific embodiments of the present invention, it is to be understood that these embodiments are being presented by way of example only. It is expected that others skilled in the art will perceive variations which, while differing from the foregoing, do not depart from the spirit and scope of the invention herein described and claimed.

I claim:

1. A split coupling for interconnecting a pair of pipes comprising: a pair of substantially identical half sections, each having a semicylindrical inner surface and a pair of faces adapted to oppose the faces of the other half section, means for joining said half sections into a single unit to form a cylindrical surface adapted to span the circumference of each pipe inserted therein, sealing means adapted to be positioned between said opposing faces to seal the inside of said coupling from outside contaminants, said sealing means is compressible to thereby allow tight closing of said opposing faces, said coupling cylindrical surface sized at one end to tightly engage a pipe when positioned therearound and sized at the other end to provide a clearance between said cylindrical surface and a pipe inserted therein to thereby allow expansion and contraction of the pipe inserted in said other end relative to the coupling and a seal cup located at said other end, said seal cup formed of substantially identical half sections overlapping said other end, said seal cup provided with flange means and means to join said half sections together in an overlapping relationship with said other end, said other end and said seal cup flange means forming a chamber adapted to receive at least one seal therein to seal the joint formed between said other end and an inserted pipe; tightening means engaging said flange means and said other end to decrease the size of said chamber thereby compressing said at least one seal into sealing engagement with said seal cup, other end and inserted pipe.

* * * * *